United States Patent [19]

Klueting

[11] 4,314,729
[45] Feb. 9, 1982

[54] HINGE MOUNT FOR SEATS HAVING RECLINEABLE BACK RESTS, PARTICULARLY FOR MOTOR VEHICLE SEATS

[75] Inventor: Bernd Klueting, Radevormwald, Fed. Rep. of Germany

[73] Assignee: Keiper Automobiltechnik GmbH & Co. KG, Remscheid, Fed. Rep. of Germany

[21] Appl. No.: 162,036

[22] Filed: Jun. 20, 1980

[30] Foreign Application Priority Data

Aug. 7, 1979 [DE] Fed. Rep. of Germany ....... 2931915

[51] Int. Cl.³ .............................................. A47C 1/025
[52] U.S. Cl. ...................................... 297/366; 16/325; 297/379
[58] Field of Search ............... 297/366, 367, 354, 355, 297/379; 16/146, 139

[56] References Cited

U.S. PATENT DOCUMENTS 4,223,947 9/1980 Cremer ............................... 297/367

FOREIGN PATENT DOCUMENTS

| 2845281 | 4/1980 | Fed. Rep. of Germany | 297/366 |
| 2845545 | 4/1980 | Fed. Rep. of Germany | 297/367 |
| 1358783 | 7/1974 | United Kingdom | 297/366 |

*Primary Examiner*—William E. Lyddane
*Attorney, Agent, or Firm*—Michael J. Striker

[57] ABSTRACT

A hinge mount for seats having reclineable back rest includes two hinge parts pivotably connected one to another. The hinge part assigned to the back rest is formed with an arresting serration cooperating with an arresting pawl supported for rotation on the fixed hinge part; a control mechanism including a cam segment is rigidly connected to a driven gear supported for rotation on the fixed hinge part and controlled by a driving gear segment manually operated by a spring biased lever. The radius of the cam segment is larger than the radius of the driven gear and extends approximately about a central angle of 120°.

9 Claims, 2 Drawing Figures

HINGE MOUNT FOR SEATS HAVING RECLINEABLE BACK RESTS, PARTICULARLY FOR MOTOR VEHICLE SEATS

BACKGROUND OF THE INVENTION

The invention relates generally to seat adjusters and more particularly to an adjustable hinge mount for seats having reclineable backrests, particularly motor vehicle seats, and including a fixed hinge part assigned to the seat proper and a tiltable hinge part assigned to the back rest, and connected by a pivot axle to the fixed hinge part whereby one of the two mount parts are arrestable in an adjusted position of the back rest by arresting means including a ratchet or serrated segment formed on the rotatable hinge part and cooperating with an arresting pawl which is pivotably mounted on the fixed hinge mount. The arresting pawl is controlled by a driven gear rotatably mounted on the fixed hinge part and supporting a cam slidably joining the arresting pawl. A manually controlled two-arm lever is provided with driving gear segments which is engageable with driven gear to rotate the same and thus the cam into an arresting position and into a releasing position of the arresting means.

In a known hinge mount of the above-described type, the hinge part secured to the reclineable back rest is provided with a disc which in the range below the pivot axle is formed with a gear segment. An arresting lever is pivotably mounted on the fixed hinge part assigned to the seat proper and is also formed with arresting gears engageable with the gear segment on the disc of the pivotable hinge part. The arresting lever is arranged so that due to its own weight the arresting gear normally moves out of engagement from the arresting segment of the disc. In order to maintain the desired adjusted inclined position of the back rest relative to the seat part, a setting lever is pivotably mounted on the fixed hinge part and is provided with a cam which urges the arresting arm to move with its arresting piece into or from the engagement with the arresting segment of the disc on the movable hinge part. For this purpose the arresting lever has in the range opposite its arresting piece a back surface which is slidably engaged by the cam attached to the setting lever when the latter is adjusted in the arresting position. At a distance from the back surface of the arresting lever there is provided a projection against which side surface of the cam abuts when the setting lever is moved into is releasing position. As a consequence the working angle of such known cam arrangement is limited and does not exceed the maximum value of about 30°. Since the angle of inclination of the camming surface of the cam has to be lower than that at which self-locking action occurs, the tensioning displacement of the cam at the above-mentioned relatively low inclination angle is also small and consequently it is insufficient both for its primary purpose, namely for securing the engagement of the arresting piece between the movable and fixed hinge parts, and for elimination of manufacturing tolerances between the mutually engaging loaded parts of the hinge mount.

SUMMARY OF THE INVENTION

It is therefore a general object of the present invention to overcome the aforementioned disadvantages.

More particularly, it is an object of the invention to provide an improved adjustable hinge mount of the aforedescribed type in which an increased path of the tensioning displacement is available for the cam which is sufficient for the elimination of manufacturing play or tolerances of respective component parts.

Another object of this invention is to provide such an improved hinge mount at which the locking cam can be reliably disengaged from its arresting position.

In keeping with these objects, and with others which will become apparent hereafter, one feature of the invention resides in the provision of arresting means including a serrated segment formed on the rotatable hinge part and a pawl pivotably mounted on the fixed hinge part opposite the threaded segment, a driven gear pivotably mounted on the fixed hinge part supporting for joint rotation a cam in the form of a spiral segment cooperating with the pawl, a spring arranged for rotating the driven gear together with the cam into an arresting position in which the cam urges the pawl into engagement with the serrated segment on the rotatable hinge part, and control means including a driving gear engageable with a driven gear to rotate the same and cam from the arresting position into a releasing position in which the pawl is disengaged from the serrated segment.

The radius of the cam segment is larger than that of the driven gear whereby the cam segment occupies approximately one third of the circumference of the driven gear. Due to this arrangement it is achieved that a relatively low inclination or pitch angle of the camming spiral segment is used which lies well below the self-locking limit of the cam and at the same time the camming surface is rotated about a relatively large central angle and consequently the cam has a relatively large adjustment pitch. For this reason, manufacturing tolerances which normally amount only to a fraction of the adjustment pitch of the cam are effectively neutralized whereas the major part of the pitch is used for compressing the arresting mechanism. Accordingly, during the manufacturing of individual parts of the hinge mount of this invention, no particularly high requirements are set for the accuracy of these parts and the play which always occurs during normal manufacturing methods can be very easily eliminated.

In the preferred embodiment of this invention, the camming surface has the form of an Archimedes spiral so that the height of the inclined camming surface increases proportionally to the increase of the central angle and therefore the pitch of the camming surface is uniform with respect to the crown circle of the driven gear. Due to the fact that the camming spiral segment extends about a central angle of 120°, and the radius of the spiral segment is larger than the radius of the driven gear, the peripheral length of the camming segment is larger than the peripheral segment of the driven gear and consequently the compressing stroke of the camming surface is considerably large while the inclination angle is below the limits of self-locking effects.

In order that the camming spiral segment upon the release of the setting lever return automatically in an arresting position in which the pawl is urged against the serrated segment, a spiral spring loads and rotates according to another feature of this invention the driven gear with the camming spiral segment in the arresting direction. One end of the biasing spring is connected to the fixed hinge part whereas the other end of the spiral spring is secured to the cam. Preferably, the setting lever is formed with a driving gear segment which during the arresting position of the cam is completely out of engagement with the driven gear and is dimensioned so as to rotate the driven gear about the entire length of the camming spiral surface.

According to still another feature of this invention, the driving gear segment controlled by the setting lever has a leading introduction tooth which at the beginning of the releasing movement of the setting lever adjusts the driving gear into a position in which the remaining teeth of the driving gear segment correctly mesh with the teeth of the driven gear. By means of this correction made by the introductory tooth it is prevented that the remaining teeth of the driving and driven gears be accidentally moved in a "tooth against tooth" mutual position when the setting lever is operated.

In order to prevent that the setting lever be positively driven during the entire length of travel of the arresting cam towards its releasing position, the setting lever is loaded by a tensioning spring in the direction in which the driving gear segment disengages the driven gear and automatically resumes a starting disengaged position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
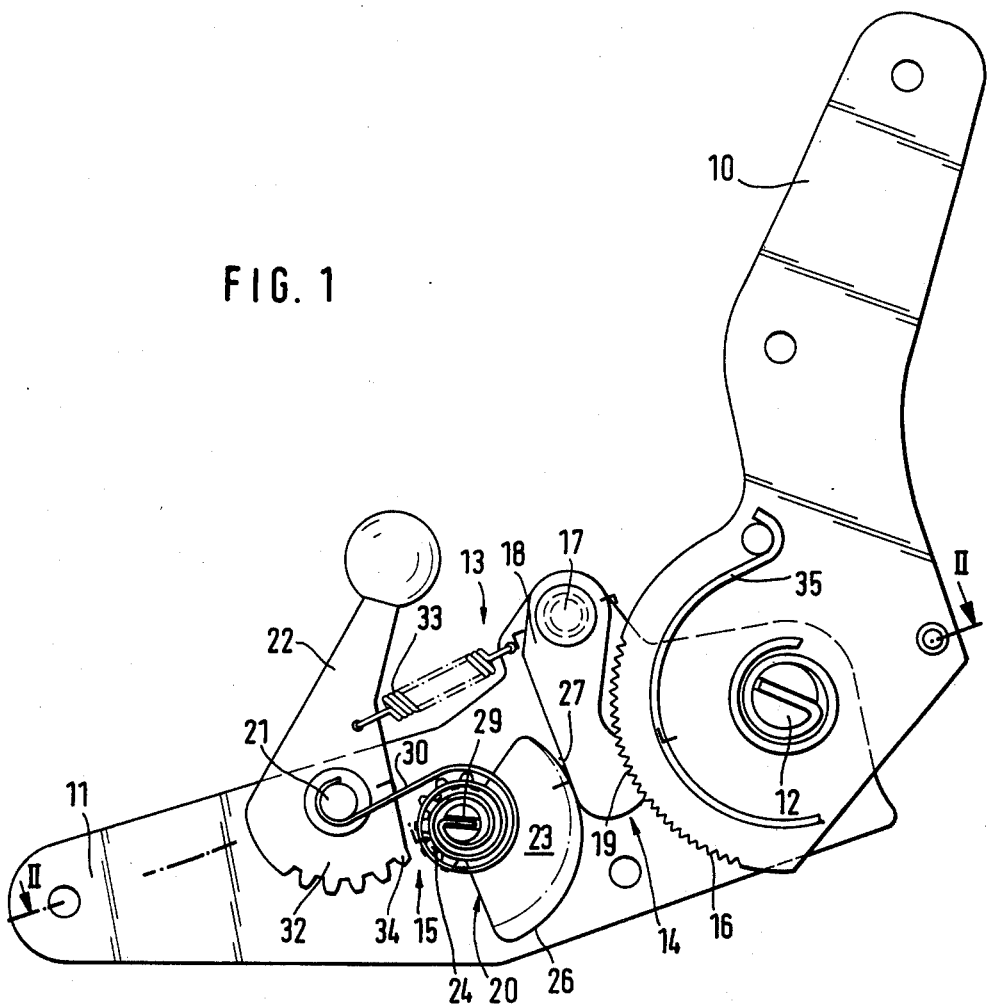
FIG. 1 is a side view of the adjustable hinge mount of this invention.
Figure 2:
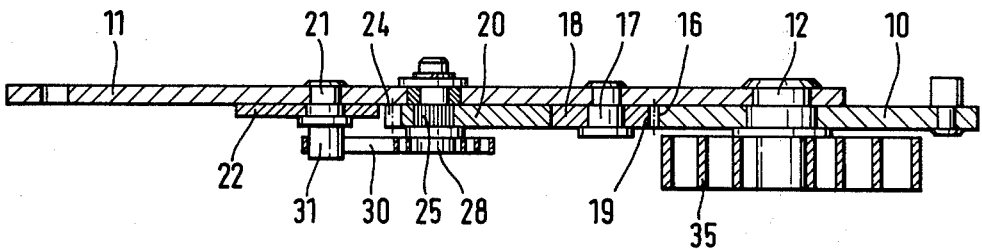
FIG. 2 is a sectional top view of the hinge mount of FIG. 1, taken along the line II—II.

The hinge mount as illustrated in FIG. 1 includes a tiltable hinge part 10 connectable to a back rest of the seat and a fixed hinge part 11 connectable to the seat proper and being rotatably connected to the rotatable hinge part 10 by a pivot axle 12. In order to arrest the adjusted angular position of the rotatable hinge part 10 relative to the fixed hinge part 11, the hinge mount includes an arresting device 13 formed by a ratchet and pawl mechanism 14 and a control device 15. The ratchet and pawl mechanism 14 includes a serrated segment 16 formed on the rotatable hinge part and an arresting pawl 18 mounted for rotation about a pivot pin 17 secured to the fixed hinge part 11. The arresting pawl 18 has at one side thereof arresting teeth 19 for engaging the threaded segment 16 on the swingable hinge part 10 and a juxtaposed rear surface for engaging an actuation cam as will be explained below. The pawl is supported for rotation on the pivot pin 17 in such a manner that its arresting teeth 19 normally disengage by the force of gravity the segment 16 when the pawl is operated. As soon as the arresting pawl is disengaged from the serrated segment, the swingable hinge part 10 is ready to be adjusted to any desired angular position of the back rest.

The actuation or control device 15 cooperating with the ratchet and pawl device 14 includes a driven gear 24 supported for rotation on the fixed hinge part 11 and of a driving gear segment 32 formed on one arm of the control lever 22 which is supported for rotation on a pivot pin 21 projecting also from the fixed hinge part 11. The driven gear 24 is integrally connected with a cam 20 in the form of a spiral segment 23 which occupies approximately one-third of the root circle of the gear 24. The cam 20 together with the driven gear 24 are connected to a central pin 25 which is supported for rotation in the fixed hinge part 11. The periphery of the spiral segment 23 defines a camming surface 26 which slidably engages the rear surface 27 opposite the arresting teeth 19 of the pawl 18. Even if the curved camming surface 26 can be shaped as a section of an arbitrary spiral in the preferred embodiment of this invention this camming surface is formed as a section of an Archmides spiral. The pivot pin 25 of the cam 20 and of the driven gear 24 is secured against axial displacement in the fixed hinge part 11 whereby the central part of the side of the cam 20 opposite the bearing pin 25 is provided with a trunnion 28 having on its end face a diametric slot 29. This slot 29 receives a bent inner end of spiral spring 30 the outer end of which is secured to a trunnion 31 opposite the pivot axle 21 of the control lever 22. The spiral spring 30 is biased so that the cam 20 together with the driven gear segment 24 are rotated counterclockwise so that the camming peripheral surface section 36 urges via the rear surface 27 the arresting teeth 19 of the pawl 18 into an arresting engagement with the serrated segment 16 of the reclineable hinge part 10.

In order to release the pawl 18 from this arresting position (as illustrated in FIG. 1) and thus to enable the angular adjustment of the reclineable hinge part 10, the lower arm of the control lever 22 is formed with the aforementioned gear segment 32 which can be brought into engagement with the driven gear 24 and rotates the same clockwise so that camming surface 26 can disengage the rear surface 27 of the pawl 18 and allow the same to rotate by its own weight into the releasing position in which its teeth 19 are disengaged from the arresting teeth 16. The driving gear segment 32 is formed such that in the arrested position of the reclineable hinge part 10 in which the inclined surface 26 of cam 20 urges the pawl 18 against the serrated segment 16, the teeth of the driving gear segment 32 completely disengage the teeth of the driven gear 24. Tension spring 33 which at one end is attached to the fixed hinge part 11 and at the other end to the upper arm of the control lever 22, maintains the driving gear segment 22 in this disengaged position. As a result, the biasing spiral spring 30 now rotates the driven gear 24 together with the cam 20 counterclockwise into the arresting position as illustrated in FIG. 1 and the pawl 18 engages with its teeth 19 the serration 16 of the tiltable hinge part 10 thus arresting the same in the adjusted reclined position.

To release again the hinge part 10 from its arrested position, the control lever 22 is rotated counterclockwise against the force of the tension spring 33 and in doing so the driving segment 32 engages the teeth of the driven segment 24. To insure a proper gear mesh during the introduction of driving gear 32 into the driven gear segment 24, the leading tooth 34 of the driving gear is adjusted in shape in such a manner that its height is shorter than that of the remaining teeth and consequently at the beginning of the shifting operation the leading tooth 34 cannot abut against a tooth of the gear segment 24 but instead is always introduced into the gap between the teeth and adjusts the angular position of the driven gear segment 24 for proper meshing with the remaining driving teeth. In this manner upon turning of the control lever 22 counterclockwise this movement is always reliably transmitted to the cam 20 which is thus turned clockwise. During the clockwise movement of the cam 20 the converging part of the spiral section 26 is moved below the back surface 27 of the pawl 18 and the arresting teeth 19 of the pawl are disengaged from the serrated segment 16 of the recliner part. As soon as the arresting mechanism 14 is released, the back rest can be adjusted to any desired position. A spiral spring 35 is arranged between the rotatable hinge part 10 and the fixed hinge part 11 to counteract the weight of the back rest and to move the latter forwardly into its upright position. On the other hand, the back rest has to be loaded against the force of the counterbalancing spring 35 to rotate the back rest and the hinge part 10 rearwardly. Upon the adjustment of the desired position of the back rest, the control lever 23 is released and by the force of the tension spring 33 is automatically moved clockwise whereby the driving gear 32 rotates the driven gear segment 24 and the cam 20 counterclockwise into the arresting position as illustrated in FIG. 1. As it has been mentioned above, the gear segment 32 is dimensioned such as to completely disengage the driven gear segment 24 and the biasing spiral spring 30 takes over to arrange the cam 20 counterclockwise and to maintain the arresting position in which the diverging part of the spiral surface 26 abuts against the rear surface 27 of the pawl 18 so that the arresting teeth firmly engage the serrations of the segment 16. In this manner, the adjusted position of the back rest is locked.

It will be understood that each of the elements described above, or two or more together, may also find a useful application in other types of constructions differing from the types described above.

While the invention has been illustrated and described as embodied in a hinge mount using an Archimedes spiral for the camming surface in its control mechanism, it is not intended to be limited to the details shown, since various modifications and structural changes may be made without departing in any way from the spirit of the present invention.

For example, instead of the Archimedes spiral it is possible to employ another radially increasing camming surface 26. It is also possible to arrange the arresting pawl 18 in such a manner that upon its disengagement from the cam 20 an additional biasing spring is used instead of the force of gravity to disengage the pawl teeth 19 from the serrated segment 16 on the reclinable hinge part 10. Furthermore, instead to form the serrated segment 16 integrally on the hinge part 10, it is possible to use separate disc which is rigidly connected to the part 10.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hinge mount for a seat having a reclineable back rest particularly a motor vehicle seat, said mount comprising a fixed hinge part assigned to the seat and a tiltable hinge part pivotably connected to the fixed hinge part and being assigned to the back rest; arresting means including a serrated segment arranged on said tiltable hinge part and a pawl pivotably mounted on said fixed hinge part opposite said serrated segment; a driven gear segment pivotably mounted on said fixed hinge part, said driven gear segment supporting for joint rotation a cam in the form of a spiral segment cooperating with said pawl, a spring arranged for rotating said driven gear segment together with said cam into an arresting position in which the spiral segment urges said pawl into engagement with said serrated segment; and control means including a driving gear engageable with said driven gear to rotate the same and said cam from said arresting position into a releasing position in which said pawl is disengaged from said serrated segment.

2. A hinge mount as defined in claim 1, wherein the radius of said cam is larger than the radius of said driven gear and occupies approximately one-third of the ground circle of the driven gear.

3. A hinge mount as defined in claim 2, wherein said spiral segment is a segment of an Archimedes spiral.

4. A hinge mount as defined in claim 2, wherein said spring for rotating said driven gear segment together with said cam into an arresting position is a spiral spring having one end attached to a central portion of said driven gear, and another end attached to said fixed hinged part.

5. A hinge mount as defined in claim 4, wherein the control means includes a two-armed control lever pivotably supported on said fixed hinge part and supporting at its lower arm a driving gear segment engageable with said driven gear to operate the latter about the entire length of said camming spiral segment.

6. A hinge mount as defined in claim 5, wherein said driving gear segment has a leading tooth which is shorter than the remaining teeth to enter the gap between the teeth of the driving gear at any angular position of the latter.

7. A hinge mount as defined in claim 5, further including a tensioning spring arranged between the upper arm of the control lever and said fixed hinge part to rotate the control lever and thus said driving gear segment into an arresting position of said cam and out of engagement from said driven gear.

8. A hinge mount as defined in claim 1, wherein said pawl has arresting teeth opposite the serrated segment and a rear surface slidably engaging said spiral segment of said cam.

9. A hinge mount as defined in claim 1, wherein said pawl is supported for rotation on said fixed hinge mount at a part permitting to disengage from said serrated segment by its own weight when released by said cam.

* * * * *